(12) United States Patent
Kobayashi

(10) Patent No.: US 9,163,587 B2
(45) Date of Patent: Oct. 20, 2015

(54) LOW-PRESSURE LOOP EGR DEVICE

(75) Inventor: Yuji Kobayashi, Tokyo (JP)

(73) Assignee: IHI Corporation, Tokyo (JP)

( * ) Notice: Subject to any disclaimer, the term of this patent is extended or adjusted under 35 U.S.C. 154(b) by 218 days.

(21) Appl. No.: 13/823,190

(22) PCT Filed: Nov. 8, 2011

(86) PCT No.: PCT/JP2011/075678
§ 371 (c)(1),
(2), (4) Date: Jul. 9, 2013

(87) PCT Pub. No.: WO2012/063801
PCT Pub. Date: May 18, 2012

(65) Prior Publication Data
US 2013/0291537 A1 Nov. 7, 2013

(30) Foreign Application Priority Data
Nov. 10, 2010 (JP) ................ P2010-251874

(51) Int. Cl.
F02B 37/10 (2006.01)
F02B 37/24 (2006.01)
F02B 39/00 (2006.01)
F02M 25/07 (2006.01)

(52) U.S. Cl.
CPC ............ *F02M 25/0709* (2013.01); *F02B 37/10* (2013.01); *F02B 37/24* (2013.01); *F02B 39/00* (2013.01); *F02M 25/0727* (2013.01); *Y02T 10/121* (2013.01); *Y02T 10/144* (2013.01)

(58) Field of Classification Search
CPC ..................................................... F02B 37/10
See application file for complete search history.

(56) References Cited

U.S. PATENT DOCUMENTS

| 8,635,869 B2 | 1/2014 | An et al. | |
| 2010/0108045 A1* | 5/2010 | Enomoto et al. | 123/674 |
| 2012/0304641 A1* | 12/2012 | Iwata et al. | 60/605.2 |

FOREIGN PATENT DOCUMENTS

| CN | 1536215 A | 10/2004 |
| JP | 5 256213 | 10/1993 |
| JP | 2004 162552 | 6/2004 |
| JP | 2005 30285 | 2/2005 |
| JP | 2005 299615 | 10/2005 |
| JP | 2008 75589 | 4/2008 |
| JP | 2008 261257 | 10/2008 |
| JP | 2008261257 A * | 10/2008 |
| JP | 2008 309133 | 12/2008 |
| JP | 2008309133 A * | 12/2008 |
| JP | 2009 24576 | 2/2009 |
| JP | 2009 174493 | 8/2009 |

(Continued)

OTHER PUBLICATIONS

U.S. Appl. No. 13/823,320, filed Mar. 14, 2013, Kobayashi.

(Continued)

*Primary Examiner* — Mary A Davis
(74) *Attorney, Agent, or Firm* — Oblon, McClelland, Maier & Neustadt, L.L.P.

(57) ABSTRACT

A low-pressure loop EGR device includes an electronic control unit. When an off signal is inputted from a key switch as a stop warning signal to give notice that a supercharged engine is about to stop, the electric control unit controls an EGR valve so as to close an EGR passage, and then controls a nozzle actuator so as to turn multiple variable nozzles in a narrowing direction.

3 Claims, 5 Drawing Sheets

(56) References Cited

FOREIGN PATENT DOCUMENTS

| | | |
|---|---|---|
| JP | 2009 243300 | 10/2009 |
| JP | 2009 243431 | 10/2009 |
| JP | 2010 14072 | 1/2010 |
| KR | 10-1322078 B1 | 10/2013 |
| WO | WO 2010/041544 A1 | 4/2010 |

OTHER PUBLICATIONS

International Search Report Issued Dec. 6, 2011 in PCT/JP11/75678 filed Nov. 8, 2011.

Combined Chinese Office Action and Search Report issued Feb. 25, 2015 in Patent Application No. 201180053582.4 (with Partial English Translation ).

\* cited by examiner

LOW-PRESSURE LOOP EGR DEVICE

TECHNICAL FIELD

The present invention relates to a low-pressure loop EGR device (exhaust gas recirculation device) for use in a supercharged engine equipped with a supercharger, which is configured to take part of an exhaust gas from a portion in an exhaust passage (an exhaust pipe) on a downstream side of a turbine of the supercharger as an EGR gas (exhaust gas recirculation gas) and to put the EGR gas back to a portion in an intake passage (an intake pipe) on an upstream side of a compressor of the supercharger.

BACKGROUND ART

A high-pressure EGR device takes an EGR gas from a portion in an exhaust passage on an upstream side of a turbine and puts the EGR gas back to a portion in an intake passage on a downstream side of a compressor. In order to reduce NOx (nitrogen oxides) contained in an exhaust gas from a supercharged engine, a low-pressure loop EGR device to replace the high-voltage loop EGR device is under development in recent years (see PTL 1 or PTL 2) from the viewpoint of ensuring a sufficient EGR quantity, and so forth. Such a low-pressure loop EGR device is configured to take an EGR gas from a portion in an exhaust passage on a downstream side of a turbine and to put the EGR gas back to a portion in an intake passage on an upstream side of a compressor.

The low-pressure loop EGR device includes an EGR passage (an EGR pipe). The EGR passage connects the portion in the exhaust passage on the downstream side of the turbine to the portion in the intake passage on the upstream side of the compressor to communicate between the portions, thereby enabling the EGR gas to communicate (flow) between these portions. In addition, an EGR valve is provided midway in the EGR passage. The EGR valve opens and closes the EGR passage. An EGR cooler is provided midway in the EGR passage at a portion closer to the exhaust passage than the EGR valve. The EGR cooler cools the EGR gas.

Accordingly, when the EGR valve opens the EGR passage while the supercharged engine is in operation, part of the exhaust gas in the exhaust passage flows as the EGR gas from the portion in the exhaust passage on the downstream side of the turbine into the EGR passage. The EGR gas flowing into the EGR passage is once cooled by the EGR cooler, and then flows from the inside of the EGR passage to the portion in the intake passage on the upstream side of the compressor. Thereby, a combustion temperature in the supercharged engine drops and an amount of emission of NOx (nitrogen oxides) is reduced as a consequence.

CITATION LIST

Patent Literature

[PTL 1] JP 2004-162552 A
[PTL 2] JP 2005-299615 A

SUMMARY OF INVENTION

After a supercharged engine is stopped, acidic substances such as sulfuric acid and nitric acid, as well as soot and the like contained in an EGR gas may remain in a compressor and an intercooler provided on a downstream side of the compressor. If this situation is left untreated, corrosion of the compressor and the intercooler may occur (progress) whereby performances of the compressor and the intercooler may deteriorate.

An object of the present invention is to provide a low-pressure loop EGR device capable of suppressing such corrosion of a compressor and an intercooler.

An aspect of the present invention is a low-pressure loop EGR device to be used in a supercharged engine provided with a supercharger and an intercooler, the supercharger having a compressor, a turbine and a turbine shaft, the compressor provided in an intake passage, the turbine provided in an exhaust passage, the turbine shaft connecting a compressor impeller in the compressor and a turbine impeller in the turbine coaxially and integrally with each other, the intercooler provided at a portion in the intake passage on a downstream side of the compressor and configured to cool air compressed by the compressor, the low-pressure loop EGR device configured to take part of an exhaust gas from a portion in the exhaust passage on a downstream side of the turbine as an EGR gas and to put the EGR gas back to a portion in the intake passage on an upstream side of the compressor. The low-pressure loop EGR device comprises: an EGR passage connecting the portion in the exhaust passage on the downstream side of the turbine to the portion in the intake passage on the upstream side of the compressor so as to communicate between the portions, and the EGR passage allowing the EGR gas to flow therebetween; an EGR valve provided in the EGR passage and configured to open and close the EGR passage; an EGR cooler provided in the EGR passage and configured to cool the EGR gas flowing into the EGR passage; and a controller configured to control the EGR valve so as to close the EGR passage upon input of a stop warning signal to give notice that the supercharged engine is about to stop, and then to control the supercharger so as to increase the number of revolutions of the turbine shaft.

Here, the "upstream side" means an upstream side from the viewpoint of a flow direction of an exhaust gas or air, and the "downstream side" means a downstream side from the viewpoint of the flow direction of the exhaust gas of the air. Meanwhile, the "stop warning signal" includes various signals, such as an off signal from a key switch, to give notice that the supercharged engine is about to stop depending on the vehicle type. Moreover, the phrase "increase the number of revolutions of the turbine shaft" includes not only an action of directly increasing the number of revolutions of the turbine shaft, but also an action of indirectly increasing the number of revolutions of the turbine shaft by means of increasing a flow rate (a flow passage area) of the exhaust gas to be supplied to the turbine impeller, for instance.

The present invention can provide a low-pressure loop EGR device, which is capable of suppressing corrosion of a compressor and an intercooler.

DESCRIPTION OF EMBODIMENTS (First Embodiment)

Figure 1:
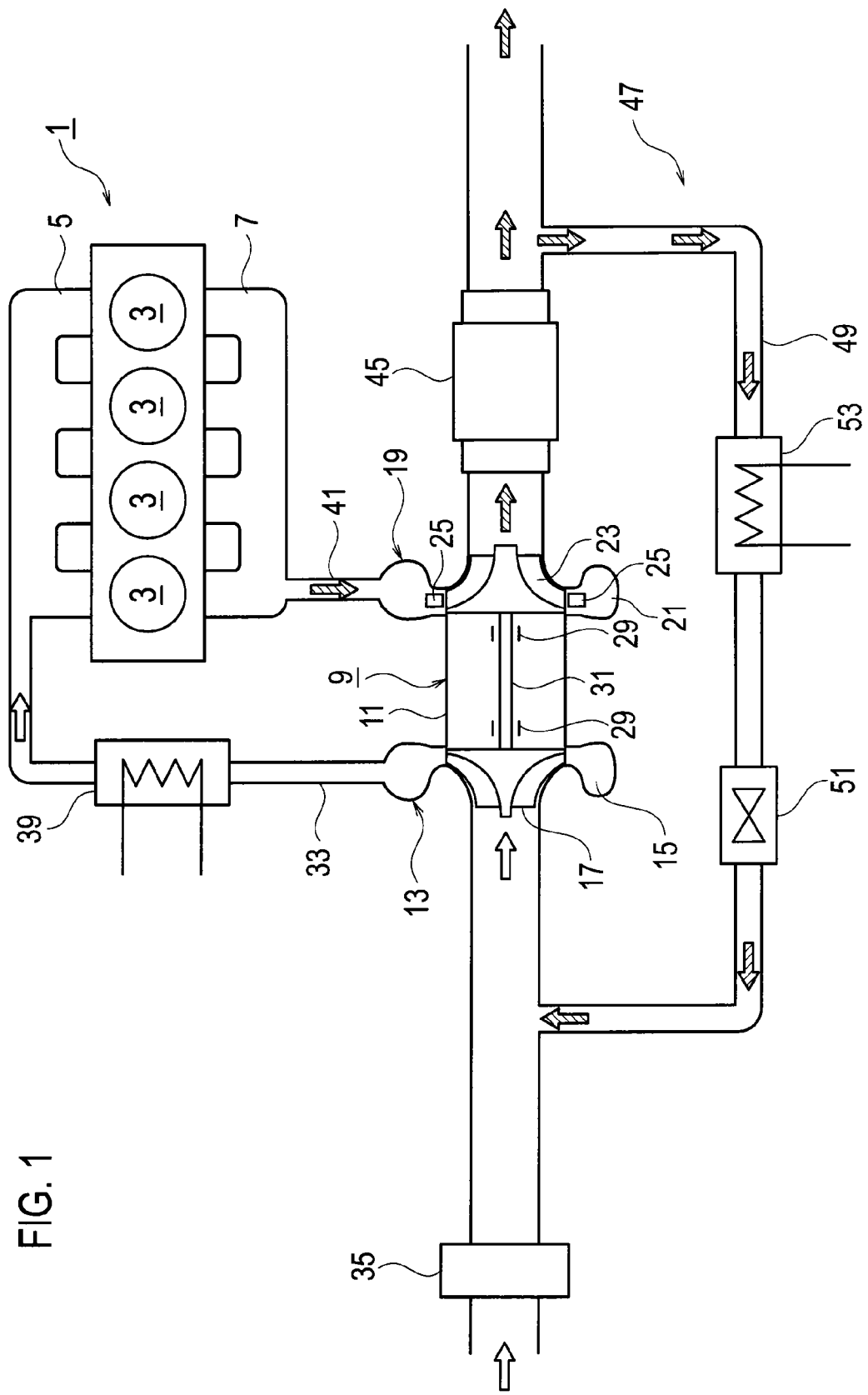
FIG. 1 is a schematic diagram showing a configuration of a supercharged engine equipped with a low-pressure loop EGR device according to a first embodiment of the present invention.
Figure 2:
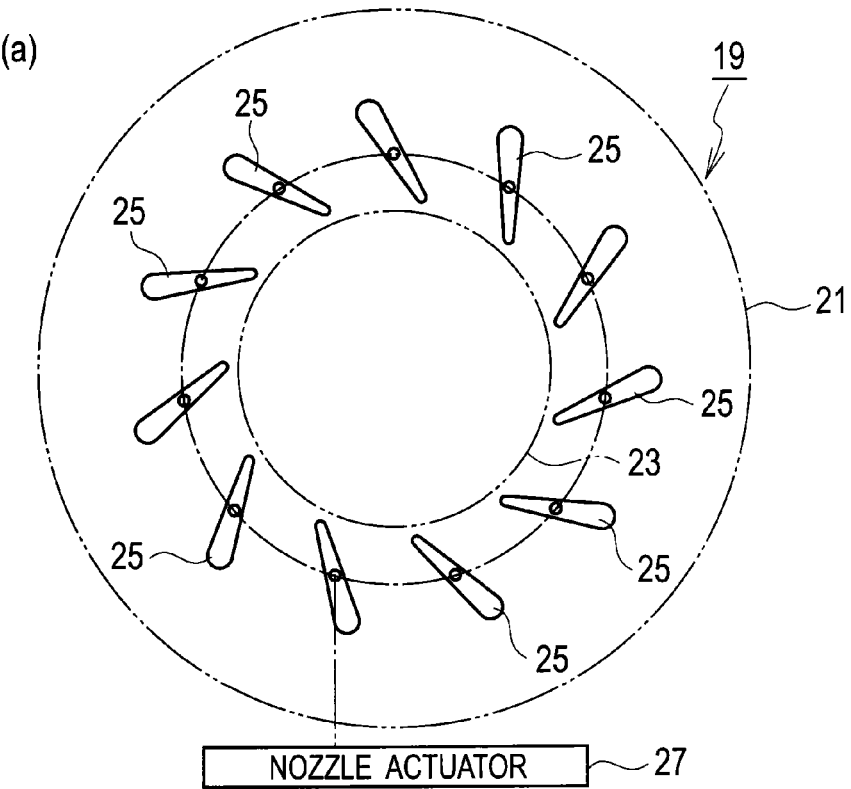
FIG. 2(a) is a schematic diagram showing a state where variable nozzles in a variable capacity supercharger according to the first embodiment are turned in a widening direction.
FIG. 2(b) is a schematic diagram showing a state where the variable nozzles in the variable capacity supercharger according to the first embodiment are turned in a narrowing direction.
Figure 2:
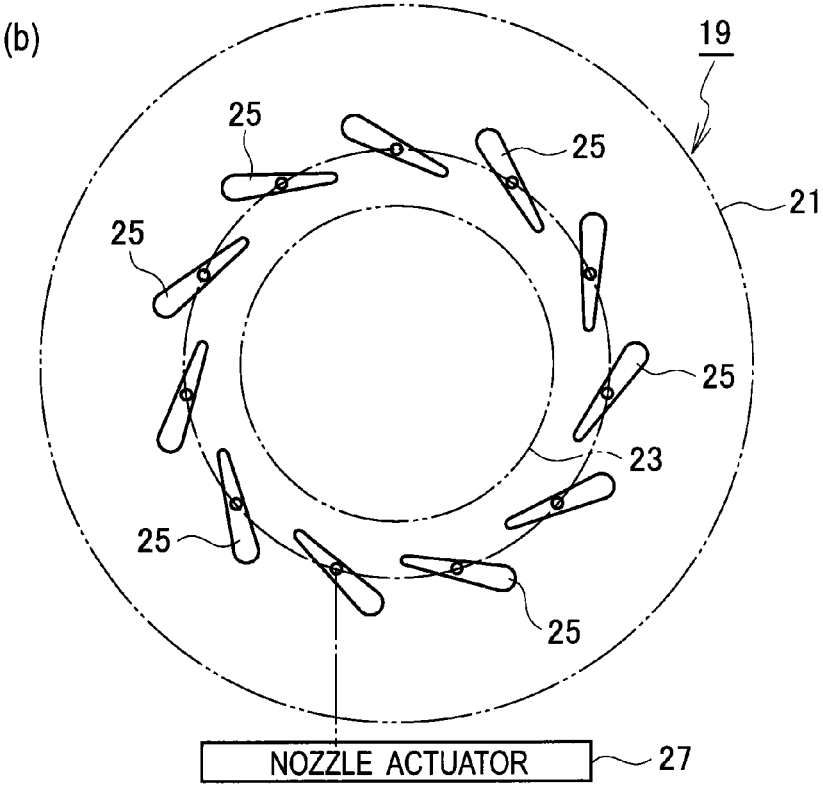

An overall configuration of a supercharged engine (inclusive of an intake system and an exhaust system) according to a first embodiment of the present invention, a configuration of a low-pressure loop EGR device according to the first embodiment, and so forth will be described below in sequence with reference to FIG. 1 to FIG. 4. In FIG. 1, hatched arrows indicate flows of an exhaust gas and an EGR gas, while hollow arrows indicate flows of air (compressed air) and the air containing the EGR gas.

As shown in FIG. 1, a supercharged engine 1 according to the first embodiment is an in-line four-cylinder diesel engine, for example. The diesel engine includes an intake manifold 5 configured to distribute the air (the compressed air) to cylinders 3, and an exhaust manifold 7 configured to collect the exhaust gas from the cylinders 3. The supercharged engine 1 is equipped with a variable capacity supercharger 9 configured to supercharge (compress) the air to be supplied to the intake manifold 5 by using thermal and pressure energy of the exhaust gas from the exhaust manifold 7. The variable capacity supercharger 9 has a publicly known configuration as disclosed in JP 2009-243300 A or JP 2009-243431 A, for example. The following is brief description of the configuration of the variable capacity supercharger 9.

The variable capacity supercharger 9 includes a base housing (a bearing housing) 11. A compressor 13 is placed on one side (the left side in FIG. 1) of the base housing 11. The compressor 13 compresses the air. The compressor 13 includes a compressor housing 15 fixed to the one side of the base housing 11, and a compressor impeller 17 rotatably provided in the compressor housing 15.

A turbine 19 is placed on the other side (the right side in FIG. 1) of the base housing 11. The turbine 19 generates rotative force by using the thermal and pressure energy of the exhaust gas. The turbine 19 includes a turbine housing 21 fixed to the other side of the base housing 11, a turbine impeller 23 rotatably provided in the turbine housing 21, multiple variable nozzles 25 arranged on an inlet side of the turbine impeller 23 in the turbine housing 21 and at intervals in a circumferential direction, and a nozzle actuator 27 such as a nozzle cylinder provided in the vicinity of the turbine housing 21 and configured to turn the multiple variable nozzles 25. Here, the multiple variable nozzles 25 widen and narrow in response to the drive of the nozzle actuator 27, and thereby adjust a flow rate (a flow passage area) of the exhaust gas to be supplied to the turbine impeller 23 (see FIG. 2(a) and FIG. 2(b)).

Multiple bearings 29 are provided in the base housing 11. The multiple bearings 29 rotatably support a turbine shaft (a rotor shaft) 31 that connects the compressor impeller 17 and the turbine impeller 23 coaxially and integrally with each other.

It should be noted that in order to adjust the flow rate of the exhaust gas to be supplied to the turbine impeller 23, the variable capacity supercharger 9 may be provided with, for example, a flapper (not shown) configured to adjust a flow passage area of a turbine scroll passage (not shown) in the turbine housing 11 instead of being provided with the variable capacity supercharger 9 with the multiple variable nozzles 25 and the nozzle actuator 27.

Next, the configurations of the intake system and the exhaust system of the supercharged engine 1 will be briefly described.

One end of an intake passage (an intake pipe) 33 for feeding the air to the intake manifold 5 is connected to the intake manifold 5 so as to communicate thereto. Meanwhile, an air cleaner 35 is placed on the other end side of the intake passage 33. The air cleaner 35 cleans the air introduced into the intake passage 33. Moreover, the above-described compressor 13 (the compressor housing 15 and the compressor impeller 17) is provided midway in the intake passage 33 on the downstream side of the air cleaner 35 from the viewpoint of the intake system inclusive of the intake passage 33. In addition, an intercooler 39 configured to cool the air that is compressed (the compressed air) is provided midway in the intake passage 33 on the downstream side of the compressor 13.

One end of an exhaust passage (an exhaust pipe) 41 for discharging the exhaust gas is connected to the exhaust manifold 7 so as to communicate thereto. Meanwhile, a particulate filter 45 is placed on the other end side of the exhaust passage 41. The particulate filter 45 traps particulate materials contained in the exhaust gas. Moreover, the above-described turbine 19 (the turbine housing 21, the turbine impeller 23, and the multiple variable nozzles 25) is provided midway in the exhaust passage 41 on the upstream side of the particulate filter 45 from the viewpoint of the exhaust system inclusive of the exhaust passage 41.

Next, a configuration of a low-pressure loop EGR device (exhaust gas recirculation device) 47 according to the first embodiment will be described.

The low-pressure loop EGR device 47 according to the first embodiment is expected to be used in the above-described supercharged engine 1. The low-pressure loop EGR device 47 takes part of the exhaust gas from a portion in the exhaust passage 41 on the downstream side of the turbine 19 as an EGR gas (exhaust gas recirculation gas) and puts the EGR gas back to a portion in the intake passage 33 on the upstream side of the compressor 13.

The low-pressure loop EGR device 47 includes an EGR passage (an EGR pipe) 49. The EGR passage 49 connects the portion in the exhaust passage 41 on the downstream side of the turbine 19 to the portion in the intake passage 33 on the upstream side of the compressor 13 to communicate between these portions, thereby enabling the EGR gas to communicate (flow) between these portions. In addition, an EGR valve 51 is provided midway in the EGR passage 49. The EGR valve 51 opens and closes the EGR passage 49, and thereby adjusts a flow rate of the EGR gas in the EGR passage 49. Further, an EGR cooler 53 is provided midway in the EGR passage 49 in a position closer to the exhaust passage 41 than the EGR valve 51. The EGR cooler 53 cools the EGR gas.

Figure 3:
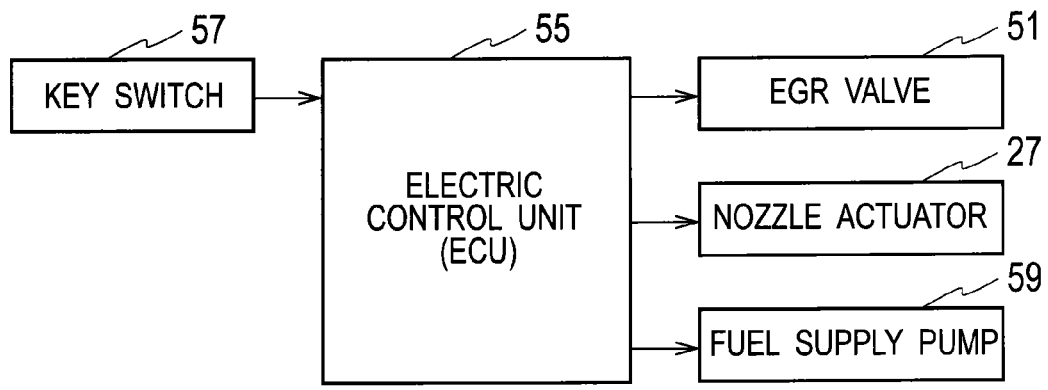
FIG. 3 is a control block diagram of an electronic control unit of the low-pressure loop EGR device according to the first embodiment.

As shown in FIG. 3, the low-pressure loop EGR device 47 includes an electronic control unit (ECU) 55 serving as a controller. The electronic control unit 55 is connected to a key switch 57, a fuel supply pump 59 configured to supply a fuel, the above-described nozzle actuator 27, and the above-described EGR valve 51. The key switch 57 outputs an off signal as a stop warning signal to give notice that the supercharged engine 1 is about to stop (i.e., a signal indicating that a key, albeit not illustrated, is turned off). When the off signal is inputted into the electronic control unit 55, the electronic control unit 55 controls the EGR valve 51 so as to close the EGR passage 49 (in other words, to set the degree of valve opening equal to 0), and then controls the nozzle actuator 27 to turn the multiple variable nozzles 25 in a narrowing direction. In addition, the electronic control unit 55 controls the fuel supply pump 59 to stop the supply of the fuel after a lapse of a predetermined period of time (such as 3 seconds) following the input of the off signal from the key switch 57.

Operation and effect of the first embodiment will now be described.

As shown in FIG. 1, the exhaust gas flows from the exhaust manifold 7 into the turbine housing 21 via the exhaust passage 41 while the supercharged engine 1 is in operation. The exhaust gas flowing into the turbine housing 21 generates the rotative force (a rotary torque) by use of thermal and pressure energy of the exhaust gas. The rotative force rotates the turbine impeller 23 and also rotates the compressor impeller 17 by means of the turbine shaft 31. In other words, the turbine impeller 23 and the compressor impeller 17 integrally rotate by means of the turbine shaft 31 that connects these impellers. Thereby, it is possible to compress the air taken into the compressor housing 15 via the intake passage 33 and to supercharge (compress) the compressed air (the air) to be supplied to the intake manifold 5. Here, the compressed air is cooled by the intercooler 39 before supplied to the intake manifold 5. Incidentally, the above-described operation will be referred to as a supercharging operation of the supercharged engine 1 for the convenience of explanation.

The supercharged engine 1 of this embodiment carries out the following operation in addition to the above-described supercharging operation. Specifically, while the supercharged engine 1 is in operation, the EGR valve 51 opens the EGR passage 49 and thereby adjusts the flow rate of the EGR gas in the EGR passage 49. As a result of the operation of the EGR valve 51, part of the exhaust gas in the exhaust passage 41 flows as the EGR gas from the portion in the exhaust passage 41 on the downstream side of the turbine 19 (in other words, the portion in the exhaust passage 41 on the downstream side of the particulate filter 45) into the EGR passage 49. The EGR gas in the EGR passage 49 is once cooled by the EGR cooler 53 and then flows from the inside of the EGR passage 49 to the portion in the intake passage 33 on the upstream side of the compressor 13 (in other words, the portion in the intake passage 33 between the compressor 13 and the air cleaner 35). In short, in this embodiment, the EGR gas can be taken out of the portion in the exhaust passage 41 on the downstream side of the turbine 19 and be put back to the portion in the intake passage 33 on the upstream side of the compressor 13 while the supercharged engine 1 is in operation. Thus, it is possible to lower a combustion temperature in the supercharged engine 1 and to reduce an amount of emission of NOx.

Figure 4:
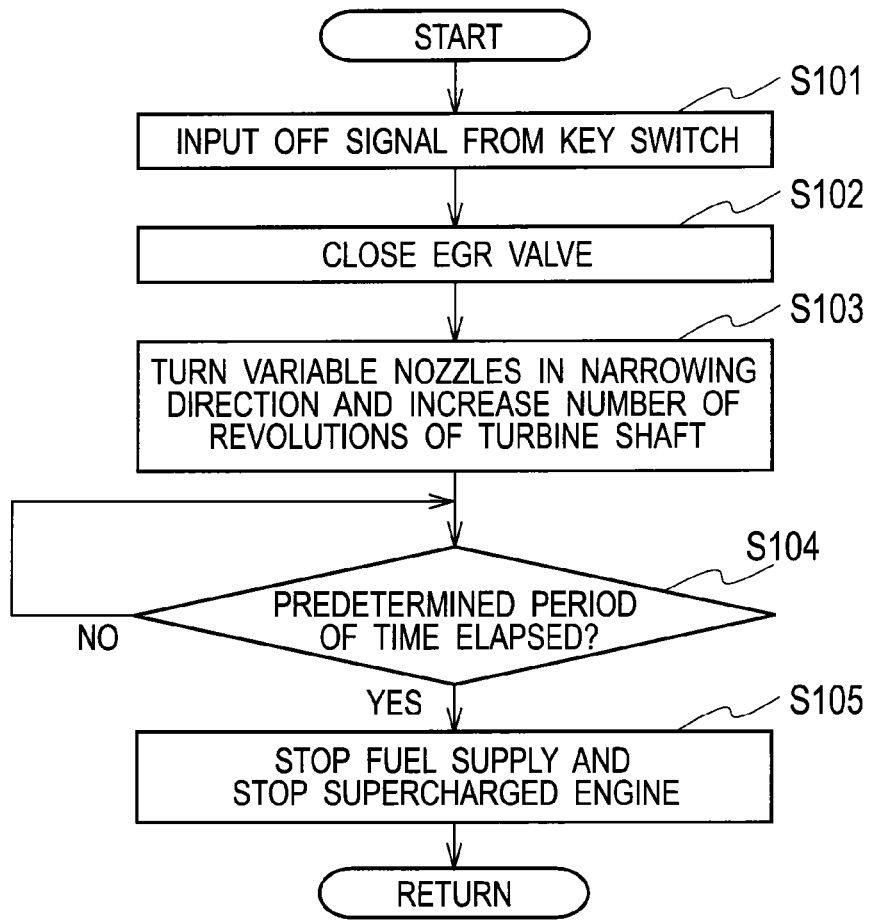
FIG. 4 is a flowchart showing an operation of the low-pressure loop EGR device according to the first embodiment.

As shown in FIG. 1 to FIG. 4, when the off signal (the stop warning signal) is inputted from the key switch 57 to the electronic control unit 55 (step S101 in FIG. 4), the electronic control unit 55 controls the EGR valve 51 and thereby closes the EGR passage 49 (step S102 in FIG. 4). Subsequently, the electronic control unit 55 controls the nozzle actuator 27 and thereby turns the multiple variable nozzles 25 in a narrowing direction, thereby increasing the number of revolutions of the turbine shaft 31 (in other words, the rotary torque of the turbine shaft 31) (step S103 in FIG. 4). Accordingly, it is possible to increase transport power (blast power) of the compressor impeller 17 by stopping the outflow of the EGR gas into the intake passage 33 immediately before the stop of the supercharged engine 1, and thereby to blow off acidic substances, soot, and the like adhering to the compressor 13 and the intercooler 39. In addition, the acidic substances, soot, and the like adhering to the compressor impeller 17 can be blown off by centrifugal force as well.

The electronic control unit 55 judges whether or not the predetermined period of time has elapsed since the input of the off signal from the key switch 57 (step S104 in FIG. 4). If the electronic control unit 55 judges that the predetermined period of time has elapsed (YES in step S104), the electronic control unit 55 stops the supply of the fuel by controlling the fuel supply pump 59, thereby stopping the supercharged engine 1 (S105 in FIG. 4). In other words, the electronic control unit 55 stops the drive of the fuel supply pump 59 after the lapse of the predetermined period of time and thus stops the supercharged engine 1. If the electronic control unit 55 judges in step S104 that the predetermined period of time has not elapsed (NO in step S104), the electronic control unit 55 continues judging the lapse of the predetermined period of time.

According to the embodiment of the present invention, the acidic substances, soot, and the like adhering to the compressor 13 and the intercooler 39 can be blown off immediately before the stop of the supercharged engine 1. As a consequence, corrosion of the compressor 13 and the intercooler 39 is less likely to occur (progress) after the stop (and during the stop) of the supercharged engine 1. Thus, it is possible to sufficiently suppress deterioration in performances of the compressor 13 and the intercooler 39.

(Second Embodiment)

Figure 5:
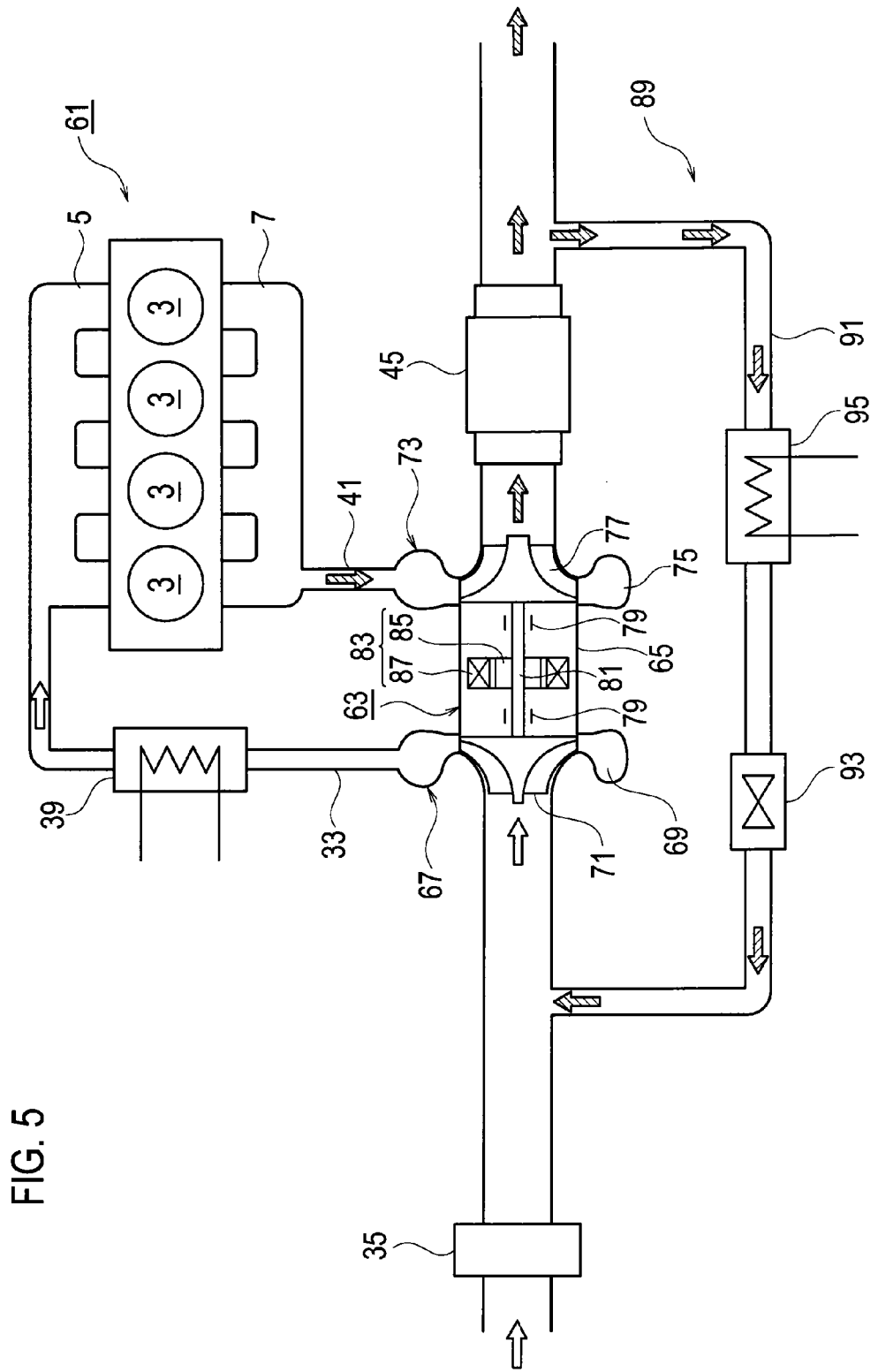
FIG. 5 is a schematic diagram showing a configuration of a supercharged engine equipped with a low-pressure loop EGR device according to a second embodiment of the present invention.

Characteristic features of an overall configuration of a supercharged engine according to a second embodiment, a configuration of a low-pressure loop EGR device according to the second embodiment, and so forth will be described below in sequence with reference to FIG. 5 to FIG. 7. In FIG. 5, hatched arrows indicate the flows of an exhaust gas and an EGR gas, while hollow arrows indicate the flows of air (compressed air) and the air containing the EGR gas.

As shown in FIG. 5, a supercharged engine 61 according to the second embodiment is an in-line four-cylinder diesel engine, for example. The supercharged engine 61 is equipped with a power-assisted supercharger 63 instead of the variable capacity supercharger 9 in the supercharged engine 1 according to the first embodiment. The power-assisted supercharger 63 is configured to supercharge (compress) the air to be supplied to the intake manifold 5 by using the thermal and pressure energy of the exhaust gas from the exhaust manifold 7. The power-assisted supercharger 63 has a publicly known configuration as disclosed in JP 2009-24576 A, for example. The following is brief description of the configuration of the power-assisted supercharger 63.

The power-assisted supercharger 63 includes a base housing (a bearing housing) 65. A compressor 67 is placed on one side (the left side in FIG. 5) of the base housing 65. The compressor 67 compresses the air. The compressor 67 includes a compressor housing 69 fixed to the one side of the base housing 65, and a compressor impeller 71 rotatably provided in the compressor housing 69. Here, the compressor 67 (the compressor housing 69 and the compressor impeller 71) is provided midway in the intake passage 33 on the downstream side of the air cleaner 35 from the viewpoint of the intake system inclusive of the intake passage 33.

A turbine 73 is placed on the other side (the right side in FIG. 5) of the base housing 65. The turbine 73 generates rotative force by using the thermal and pressure energy of the exhaust gas. The turbine 73 includes a turbine housing 75 fixed to the other side of the base housing 65, and a turbine impeller 77 rotatably provided in the turbine housing 75. Here, the turbine 73 (the turbine housing 75 and the turbine impeller 77) is provided midway in the exhaust passage 41 on the upstream side of the particulate filter 45 from the viewpoint of the exhaust system inclusive of the exhaust passage 41.

Multiple bearings 79 are provided in the base housing 65. The multiple bearings 79 rotatably support a turbine shaft 81 that connects the compressor impeller 71 and the turbine impeller 77 coaxially and integrally with each other. In addition, an electric motor 83 configured to secondarily rotate the turbine shaft 81 is placed in the base housing 65. The electric motor 83 includes a rotor 85 integrally connected to the turbine shaft 81, and an annular stator 87 provided in the base housing 65 so as to surround the rotor 85.

Note that the portions in the configuration of the supercharged engine 61 according to the second embodiment, which are common to those in the configuration of the supercharged engine 1 according to the first embodiment, will be denoted by the same reference numerals in the drawings and relevant description will be omitted.

Next, a configuration of a low-pressure loop EGR device (exhaust gas recirculation device) 87 according to the second embodiment will be described.

The low-pressure loop EGR device 89 according to the second embodiment is expected to be used in the above-described supercharged engine 61. The low-pressure loop EGR device 89 takes part of the exhaust gas from a portion in the exhaust passage 41 on the downstream side of the turbine 73 as the EGR gas and puts the EGR gas back to a portion in the intake passage 33 on the upstream side of the compressor 67.

The low-pressure loop EGR device 89 includes an EGR passage 91. The EGR passage 91 connects the portion in the exhaust passage 41 on the downstream side of the turbine 73 to the portion in the intake passage 33 on the upstream side of the compressor 67 so as to establish communication, thereby enabling the EGR gas to communicate (flow) between these portions. In addition, an EGR valve 93 is provided midway in the EGR passage 91. The EGR valve 93 opens and closes the EGR passage 91. In other words, the EGR valve 93 adjusts the flow rate of the EGR gas in the EGR passage 91. An EGR cooler 95 is provided midway in the EGR passage 91 at a portion closer to the exhaust passage 41 than the EGR valve 93. The EGR cooler 95 cools the EGR gas.

Figure 6:
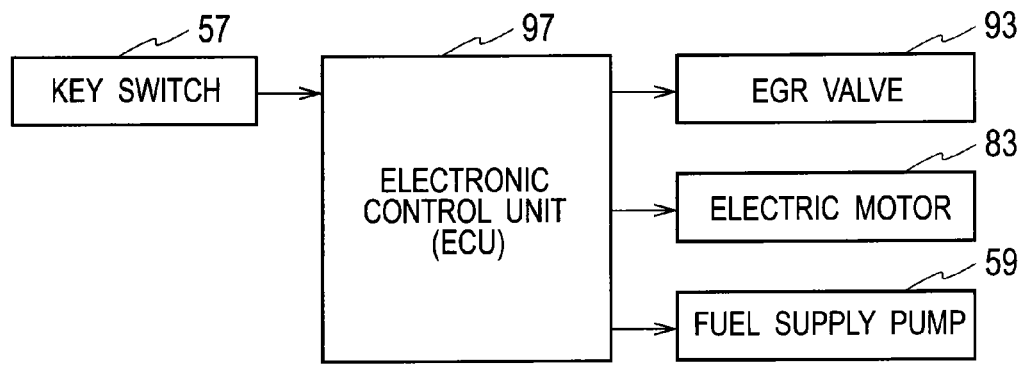
FIG. 6 is a control block diagram of an electronic control unit of the low-pressure loop EGR device according to the second embodiment.

As shown in FIG. 6, the low-pressure loop EGR device 89 includes an electronic control unit (ECU) 97 serving as a controller. The electronic control unit 97 is connected to the above-described key switch 57, the above-described fuel supply pump 59, the above-described electric motor 83, and the above-described EGR valve 93. When the off signal is inputted from the key switch 57 to the electronic control unit 97, the electronic control unit 97 controls the EGR valve 93 so as to close the EGR passage 91, and then controls the electric motor 83 so as to increase the number of revolutions of the turbine shaft 81 (in other words, the rotary torque of the turbine shaft 81). In addition, the electronic control unit 97 controls the fuel supply pump 59 so as to stop supply of the fuel after a lapse of a predetermined period of time (such as 3 seconds) following the input of the off signal from the key switch 57.

Operation and effect of the second embodiment will be described with reference to FIG. 5 to FIG. 7.

As shown in FIG. 5, the supercharged engine 61 according to the second embodiment can also achieve similar operation to the supercharging operation of the supercharged engine 1 according to the first embodiment. In addition, the following operation is executed as in the case of the supercharged engine 1. Specifically, while the supercharged engine 61 is in operation, the EGR valve 93 opens the EGR passage 91. In other words, the EGR valve 93 adjusts the flow rate of the EGR gas in the EGR passage 91. As a result of the operation of the EGR valve 93, part of the exhaust gas in the exhaust passage 41 flows as the EGR gas from the portion in the exhaust passage 41 on the downstream side of the turbine 73 (in other words, the portion in the exhaust passage 41 on the downstream side of the particulate filter 45) into the EGR passage 91. The EGR gas flowing into the EGR passage 91 is once cooled by the EGR cooler 95 and then flows from the inside of the EGR passage 91 to the portion in the intake passage 33 on the upstream side of the compressor 67 (in other words, the portion in the intake passage 33 between the compressor 67 and the air cleaner 35). In short, in this embodiment, the EGR gas can be taken out of the portion in the exhaust passage 41 on the downstream side of the turbine 73 and be put back to the portion in the intake passage 33 on the upstream side of the compressor 67 while the supercharged engine 61 is in operation. Thus, it is possible to lower the combustion temperature in the supercharged engine 61 and to reduce an amount of emission of NOx.

Figure 7:
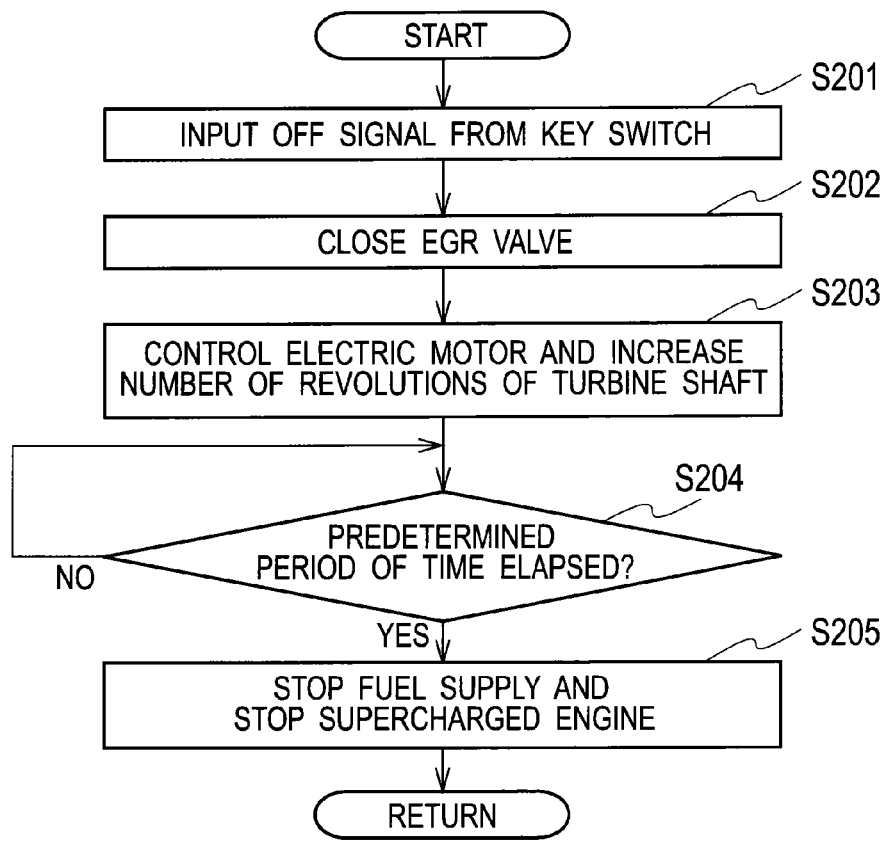
FIG. 7 is a flowchart showing an operation of the low-pressure loop EGR device according to the second embodiment.

Here, as shown in FIG. 5 to FIG. 7, when the off signal (the stop warning signal) is inputted from the key switch 57 to the electronic control unit 97 (step S201 in FIG. 7), the electronic control unit 97 controls the EGR valve 93 and thereby closes the EGR passage 91 (step S202 in FIG. 7). Subsequently, the electronic control unit 97 controls the electric motor 83, and thereby increases the number of revolutions of the turbine shaft 81 (step S203 in FIG. 7). Accordingly, it is possible to increase transport power (blast power) of the compressor impeller 71 by stopping the outflow of the EGR gas into the intake passage 33 immediately before the stop of the supercharged engine 61, and thereby to blow off acidic substances, soot, and the like adhering to the compressor 67 and the intercooler 39. In addition, the acidic substances, soot, and the like adhering to the compressor impeller 71 can be blown off by the centrifugal force as well.

The electronic control unit 97 judges whether or not the predetermined period of time has elapsed since the input of the off signal from the key switch 57 (step S204 in FIG. 7). If the electronic control unit 97 judges that the predetermined period of time has elapsed (YES instep S204), the electronic control unit 97 stops the supply of the fuel by controlling the fuel supply pump 59, thereby stopping the supercharged engine 61 (S205 in FIG. 7). If the electronic control unit 97 judges in step S204 that the predetermined period of time has not elapsed (NO in step S204), the electronic control unit 97 continues judging the lapse of the predetermined period of time.

According to the second embodiment, the acidic substances, soot, and the like adhering to the compressor 67 and the intercooler 39 can be blown off immediately before the stop of the supercharged engine 61. As a consequence, corrosion of the compressor 67 and the intercooler 39 is less likely to occur (progress) after the stop (and during the stop) of the supercharged engine 61. Thus, it is possible to sufficiently suppress deterioration in performances of the compressor 67 and the intercooler 39.

The present invention is not limited only to the above-described embodiments but can also be realized in other various aspects. It should also be understood that the scope of the right to be encompassed by the present invention is not limited only to the above-described embodiments.

The invention claimed is:

1. A low-pressure loop EGR system comprising:
   an EGR passage configured to connect a portion in an exhaust passage on a downstream side of a turbine in a supercharged engine to a portion in an intake passage on an upstream side of a compressor in the supercharged engine so as to communicate between the portions to allow the EGR gas to flow therebetween;
   an EGR valve provided in the EGR passage and configured to open and close the EGR passage;
   an EGR cooler provided in the EGR passage and configured to cool the EGR gas flowing into the EGR passage; and
   a controller configured to control the EGR valve so as to close the EGR passage upon input of a stop warning signal to give notice that the supercharged engine is about to stop, and then to control an actuator to turn a plurality of variable nozzles in a narrowing direction, the variable nozzles being arranged on an inlet side of a turbine impeller at intervals in a circumferential direction, each variable nozzle being turnable around an axis parallel to an axis of the turbine impeller.

2. The low-pressure loop EGR system according to claim 1, wherein the stop warning signal is an off signal from a key switch.

3. The low-pressure loop EGR system according to claim 1, wherein the controller is configured to stop a fuel supply pump of the supercharged engine after a predetermined period of time has elapsed after the actuator has turned the plurality of variable nozzles in the narrowing direction.

* * * * *